US011185755B2

(12) United States Patent
Yeung et al.

(10) Patent No.: US 11,185,755 B2
(45) Date of Patent: Nov. 30, 2021

(54) VIRTUAL SKYCAM SYSTEM

(71) Applicant: Intel Corporation, Santa Clara, CA (US)

(72) Inventors: Fai Yeung, Palo Alto, CA (US); Patrick Youngung Shon, Milpitas, CA (US); Shaun Peter Carrigan, Fremont, CA (US); Gilson Goncalves de Lima, San Francisco, CA (US); Vasanthi Jangala Naga, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/832,959

(22) Filed: Mar. 27, 2020

(65) Prior Publication Data

US 2020/0222783 A1 Jul. 16, 2020

(51) Int. Cl.
| | |
|---|---|
| *G10L 25/51* | (2013.01) |
| *A63B 71/06* | (2006.01) |
| *H04N 5/232* | (2006.01) |
| *H04N 5/247* | (2006.01) |
| *H04N 5/225* | (2006.01) |
| *H04N 7/18* | (2006.01) |

(52) U.S. Cl.
CPC .......... *A63B 71/0622* (2013.01); *G10L 25/51* (2013.01); *H04N 5/2253* (2013.01); *H04N 5/23212* (2013.01); *H04N 5/23299* (2018.08); *H04N 5/247* (2013.01); *H04N 7/18* (2013.01); *A63B 2071/0638* (2013.01)

(58) Field of Classification Search
CPC ............. H04N 5/23299; H04N 5/2253; H04N 5/23212; H04N 5/247; H04N 7/18; G10L 25/51
See application file for complete search history.

(56) References Cited

U.S. PATENT DOCUMENTS

| | | | | |
|---|---|---|---|---|
| 2010/0026809 A1* | 2/2010 | Curry | ..................... | G06K 9/209 348/157 |
| 2015/0340066 A1* | 11/2015 | Lokshin | ............... | G11B 27/031 386/201 |

* cited by examiner

*Primary Examiner* — Dave Czekaj
*Assistant Examiner* — Berteau Joisil
(74) *Attorney, Agent, or Firm* — Fletcher Yoder, P.C.

(57) ABSTRACT

A system includes at least one processor and at least one non-transitory computer-readable media communicatively coupled to the at least one processor. In some embodiments, the at least one non-transitory computer-readable media stores instructions which, when executed, cause the processor to perform operations including receiving a first set of sensor data within a first time frame and receiving a set of skycam actions within the first time frame. In certain embodiments, the operations also include generating a set of reference actions corresponding to the first set of sensor data and the set of skycam actions. In some embodiments, the operations also include receiving a second set of sensor data associated with a second game status, a second game measurement, or both. The operations also include generating a sequence of skycam actions based on a comparison between the second set of sensor data and the set of reference actions.

21 Claims, 9 Drawing Sheets

VIRTUAL SKYCAM SYSTEM

BACKGROUND

The present disclosure relates generally to controlling a virtual skycam.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Skycams are aerial camera systems suspended by cables and capable of moving freely through three-dimensional space. Skycams are typically employed to provide overhead views of sporting events. Conventional skycams require a number of elevated anchoring points positioned at multiple locations around a stadium in order to support the weight of the skycam and provide maneuverability for the skycam. Operation of a sky cam requires both a camera action operator and a movement operator. As a result, operation and setup of a skycam can be both costly and time-consuming.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In an embodiment, a system includes at least one processor and at least one non-transitory computer-readable media communicatively coupled to the at least one processor. In certain embodiments, the at least one non-transitory computer-readable media stores instructions which, when executed, cause the processor to perform operations. In certain embodiments, the operations include receiving a first set of sensor data within a first time frame, the first set of sensor data associated with a first game status, a first game measurement, or a combination thereof. In certain embodiments, the operations also include receiving a set of skycam actions including one or more movements of a skycam, one or more changes in focal length of the skycam, or both. In certain embodiments, the set of skycam actions are received within the first time frame. In certain embodiments, the operations also include generating a set of reference actions corresponding to the first set of sensor data and the set of skycam actions. In certain embodiments, the operations also include receiving a second set of sensor data associated with a second game status, a second game measurement, or both. In certain embodiments, the operations also include, based on a comparison between the second set of sensor data and the set of reference actions, generating a sequence of skycam actions.

In another embodiment, a method includes receiving a set of skycam actions during a first time frame, the set of skycam actions including one or more movements of a skycam, one or more changes in focal length of the skycam, or both. In certain embodiments, the method also includes recording, in response to receiving the set of skycam actions, a first set of sensor data associated with the first time frame. In certain embodiments, the method also includes receiving a second set of sensor data, the second set of sensor data during a second time frame. In certain embodiments, the method also includes, based on a comparison between the second set of sensor data and the first set of sensor data, generating a sequence of skycam actions based on the set of skycam actions.

In another embodiment, a non-transitory, computer-readable medium includes instructions that, when executed, are configured to cause a processor to perform operations. In certain embodiments, the operations include generating a set of reference actions corresponding to a first set of sensor data and a set of skycam actions, the set of skycam actions including one or more movements of a skycam, one or more changes in focal length of the skycam, or both. In certain embodiments, the operations include receiving a second set of sensor data associated with a game status, a game measurement, or both. In certain embodiments, the operations also include receiving a sequence of images from a plurality of cameras disposed about an area and generating a sequence of virtual skycam actions based on the sequence of images and a comparison between the second set of sensor data and the set of reference actions.

Figure 1:
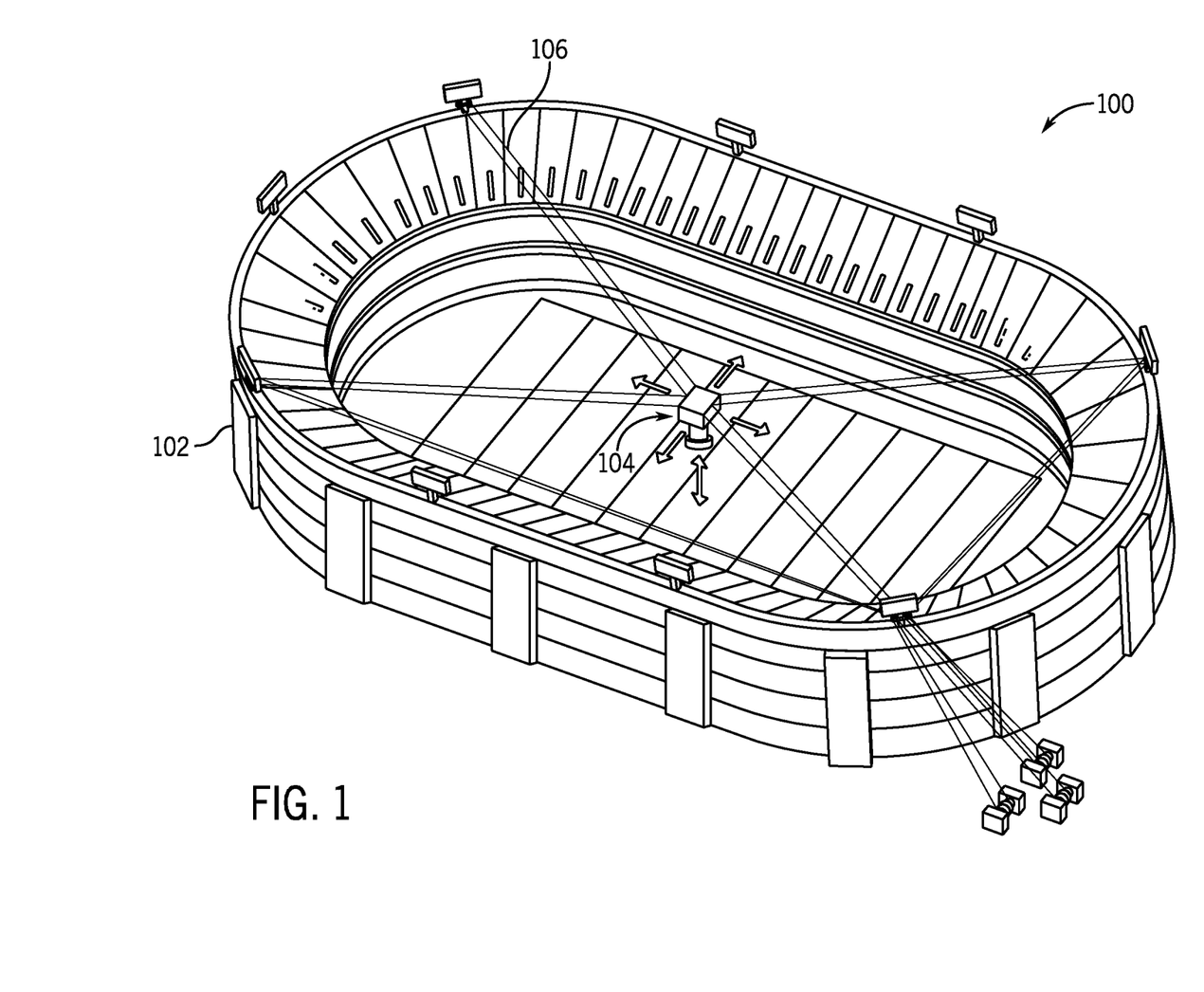
FIG. 1 is a schematic diagram of a skycam system, in accordance with an embodiment of the present disclosure.

With the preceding in mind, FIG. 1 is a schematic diagram of a skycam system 100, according to embodiments of the present disclosure. The skycam system 100 may include a skycam 104 disposed above a playing surface of a venue 102 and a number of cables 106 anchoring the skycam 104 and suspending the skycam 104 above the playing surface. The skycam 104 may include a motor coupled to the cables 106. The movement of the skycam 104 may be controlled by a first operator while camera actions (e.g., zoom, tilt, pan, and so on) may be controlled by a second operator. Alternatively, the movement and camera actions of the skycam 104 may be controlled by a computer. The skycam 104 may capture audiovisual information about an event occurring at the venue, such as a sporting event, a concert, a speech, a ceremony, or any other suitable live event.

Figure 2:
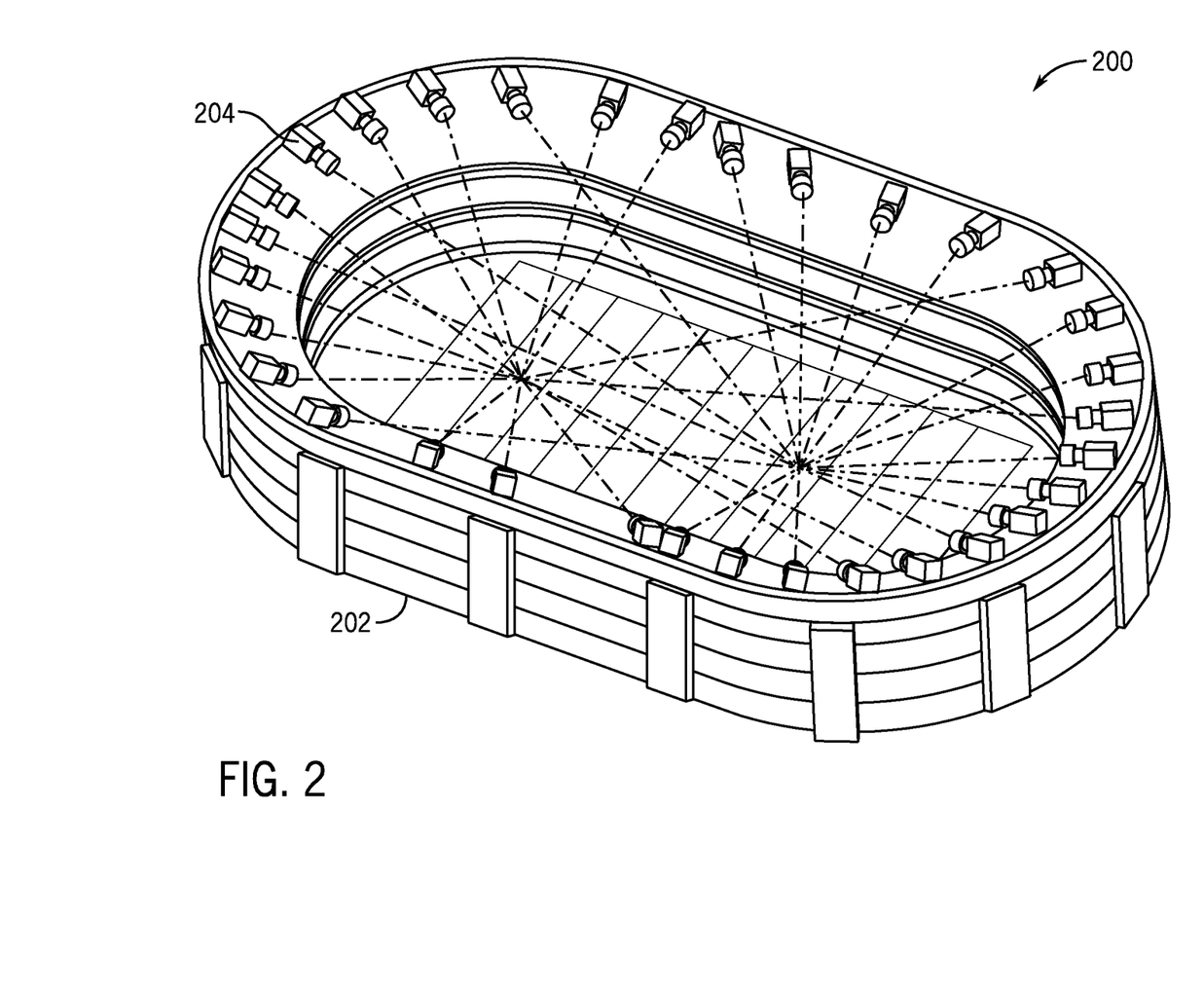
FIG. 2 is schematic diagram of multiple cameras positioned about a venue that may provide a virtual skycam system, in accordance with an embodiment of the present disclosure.

FIG. 2 illustrates a schematic diagram of a camera array 200 that may be used in a virtual skycam system, as described herein. The camera array 200 may include any number of cameras 204 positioned at multiple locations about a stadium 202. Each of the cameras 204 may capture images of an event (e.g., a football player catching a pass, a soccer player scoring a goal, an entertainer singing on stage) occurring in the stadium 202. Each of the cameras may capture information including height, width, depth, and other suitable attributes for generating a set of virtual objects. For example, a virtual object may be a virtual player on a field of the stadium 202, a virtual ball, or a virtual line marker. The images and data captured by the cameras 204 may be processed and analyzed to generate the set of virtual objects and a set of virtual images for a virtual camera. For example, the set of virtual images may be generated by piecing together audiovisual information captured by the cameras 204. Each camera may capture a different view of the event occurring in the stadium 202.

Figure 3:
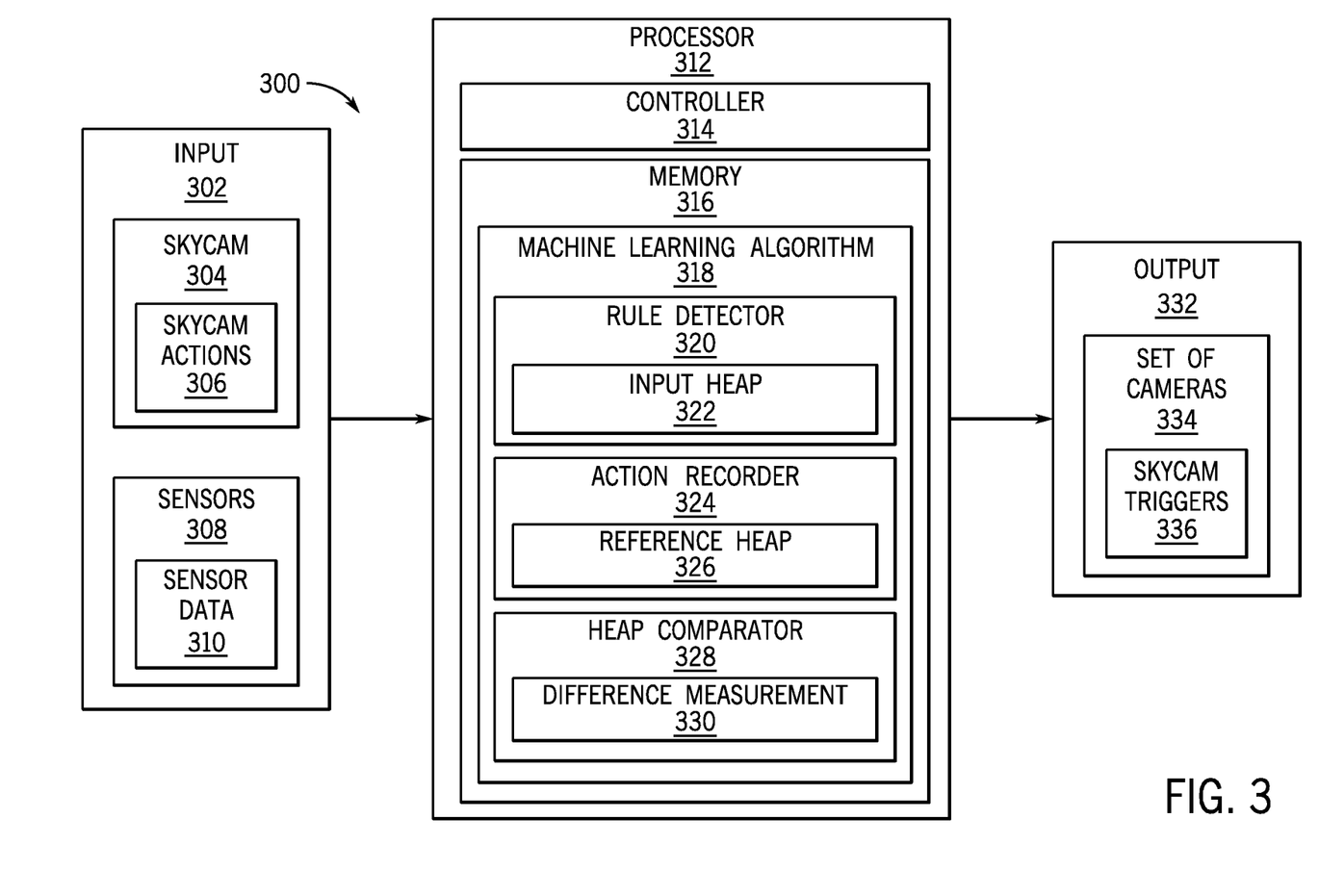
FIG. 3 is a block diagram of a virtual skycam system, in accordance with an embodiment of the present disclosure.

With the preceding in mind, FIG. 3 illustrates a block diagram of a virtual skycam system 300, according to embodiments of the present disclosure. The virtual skycam system 300 may determine how to autonomously operate a skycam, such as skycam 104, and/or any number of cameras 204 to generate a virtual skycam. The virtual skycam system 300 may monitor the operation of a skycam, such as skycam 104, and associate any number of operations performed by the skycam with conditions inside and/or outside a venue. In certain embodiments, the virtual skycam system 300 may include a processor 312, which may be provided in the form of a computing device, such as a personal computer, a laptop, a tablet, a mobile device, a server, or any other suitable computing device. As such, the processor 312 may include one or more general purposes microprocessors, one or more application specific processors (ASICs), and/or one or more field programmable logic arrays (FPGAs). In certain embodiments, the virtual skycam system 300 may learn a set of skycam triggers (i.e., a sequence of skycam actions) for a set of skycam behaviors (e.g., camera actions, movement actions, or both) for a conventional skycam 304 by monitoring an input set of skycam behaviors and associating the input set of skycam behaviors with corresponding sensor data occurring in a same time duration.

As an example, the virtual skycam system 300 may monitor operation of a skycam 304 during the final play of an American football game. During the final play, a team behind in points may make a last ditch attempt to score in order to tie or win the game by throwing a football from a starting position to a designated endzone. Oftentimes, the starting position may be thirty or more yards from the designated endzone, requiring a lofty, arcing throw from a player on the team. As a result, the skycam operators may first position the skycam to capture a narrow angle view of the competing teams' formations before the football is snapped and the play begins, then shift to a wide angle view capturing a downfield view of the arcing throw, and finally shifting to a narrow view zooming in and focusing on players awaiting the throw in the designated endzone. The virtual skycam system 300 may associate the input set of skycam operations, such as capturing the narrow angle view of the teams' formations, shifting to the wide angle downfield view, shifting to the narrow endzone view, and any other relevant skycam operations, of the final play with sensor data, such as an audience decibel level, time left in the game, score of the game, position of the football on the field of play, and any other relevant sensor data. In doing so, the virtual skycam system 300 may generate a set of skycam triggers for operating a conventional skycam and/or generating a sequence of images for a virtual skycam. Any number of cameras, such as cameras 204, may be used to generate the sequence of images for the virtual skycam. For example, the sequence of images may correspond to audiovisual information collected by the cameras 204 and pieced together by the virtual skycam system 300. For example, when the virtual skycam system 300 detects a new set of sensor data corresponding to a previously collected set of sensor data, the virtual skycam system 300 may operate a skycam with the same set of operations associated with the previously collected set of sensor data. Alternatively, the virtual skycam system 300 may operate a virtual skycam by generating a sequence of virtual images collected from any number of cameras. The sequence of virtual images may correspond to a set of images captured during the same set of operations for the conventional skycam associated with the previously collected sensor data.

The processor 312 may include a controller 314. The controller 314 may be communicatively coupled to the processor 312. Additionally, the controller 314 may be communicatively coupled to the skycam 304 and the set of sensors 308. The controller 314 may include receiving and conversion circuitry. The controller 314 of the virtual skycam system 300 may receive a set of inputs 302, which may include a set of skycam actions (i.e., operations) 306 and a set of sensor data 310 from any number of sensors 308. In some embodiments, the set of skycam actions 306 may include a set of camera actions and a set of movement actions. For example, the set of camera actions may include a pan, a tilt, a zoom, a focus, any other suitable camera action, and any combination thereof. In certain embodiments, the set of movement actions may include a direction of travel, a speed of travel, an acceleration, any other suitable movement action, and any combination thereof.

In certain embodiments, the set of sensors 308 may include a decibel meter, a motion sensor, an infrared sensor, a temperature sensor, and any other suitable sensor. The set of sensor data 310 may include a set of game data, a set of stadium data, and a set of player data. For example, the set of game data may include any data associated with a status of the game, such as time remaining in the game, time elapsed in the game, time remaining on a game clock, a current score of the game, down and distance for an American football game, and any other suitable game data. The set of stadium data may include a decibel level in the stadium, an amount of movement by an audience in the stadium, an amount of audience members, and any other suitable stadium data. The set of player data may include a set of player locations, a set of teams competing in the game, a current player in possession of the ball, a set of notable players currently on the field, a location of the ball, a speed of a respective player, an acceleration of a respective player, a distance between two players, a difference in speed between two players, a difference in acceleration between two players, and any other suitable player data.

The controller 314 may generate an output 332 that includes a set of skycam triggers 336 (e.g., a sequence of skycam actions) for operating a conventional skycam and/or generating a sequence of images for a virtual skycam from a set of cameras 334, by executing any suitable algorithm, such as a machine learning algorithm 318, in response to receiving the set of inputs 302. In some embodiments, the set of skycam triggers 336 may be intended to mimic a set of operations for a conventional skycam controlled by any number of operators. A machine learning algorithm 318 may analyze the set of inputs 302 and generate the output 332. For example, the machine learning algorithm 318 may generate a set of skycam operations associated with a set of conditions for a skycam and/or a virtual skycam. The machine learning algorithm 318 may determine a set of conditions to be satisfied in order to cause a system to operate the skycam and/or the virtual skycam using the set of skycam operations. In certain embodiments, the machine learning algorithm 318 may be a set of instructions to be performed by the controller 314. For example, the machine learning algorithm 318 may be implemented as software stored in a memory 316 and/or a storage device of the virtual skycam system 300. In some embodiments, the memory 316 may include one or more tangible, non-transitory computer readable-media that store instructions executable by the controller 314 and/or data to be processed by the controller 314. For example, the memory 316 may include random access memory (RAM), read only memory (ROM), rewritable non-volatile memory, such as flash memory, hard drives, optical discs, and/or the like. The machine learning algorithm 318 may receive the set of inputs 302 and generate the output 332.

The machine learning algorithm 318 may include a rule detector component 320, an action recorder component 324, and a heap comparator component 328. In certain embodiments, the rule detector component 320 may collect sensor data and may determine conditions associated with the collected sensor data. The rule detector component 320 may generate an input heap 322 from the set of sensor data 310, as described further herein. In certain embodiments, the action recorder component 324 may associate skycam operations with collected sensor data and associated conditions. The action recorder component 324 may generate a reference heap 326 from the input heap 322, as described further herein. The reference heap 326 may be indicative of a set of reference skycam actions and a set of sensor data. In certain embodiments, the heap comparator component 328 may update associations between skycam operations, collected sensor data, and conditions associated with the sensor data and may generate skycam triggers that operate a skycam in response to newly collected sensor data. The heap comparator component 328 may generate a distance (e.g., difference) measurement 330 from the reference heap 326, as described further herein. In some embodiments, the machine learning algorithm 318 may include additional or fewer components than depicted in FIG. 3 and may still perform the operations described herein.

Figure 4:
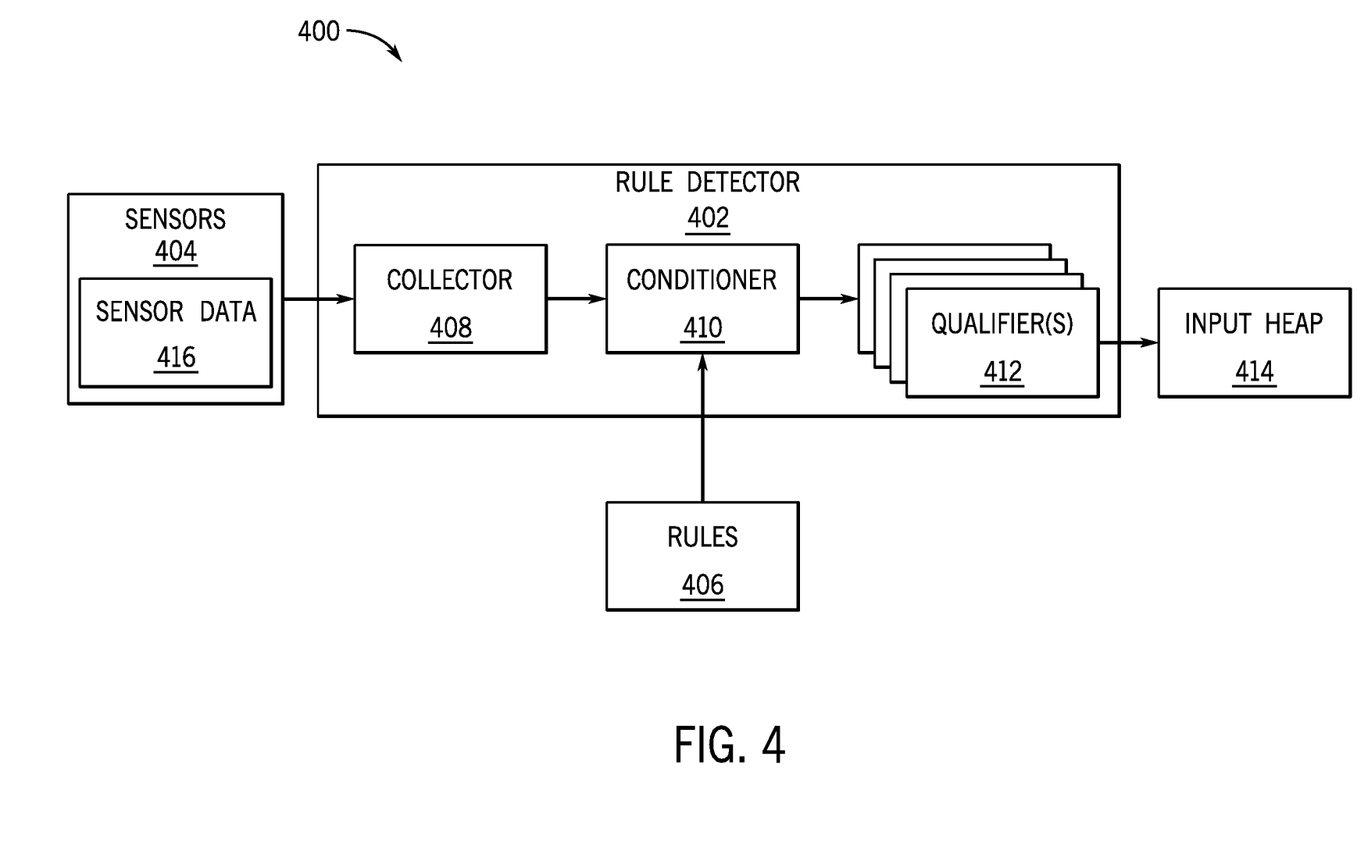
FIG. 4 is a block diagram of a rule detector component of the virtual skycam system of FIG. 3, in accordance with an embodiment of the present disclosure.

The controller 314 may analyze a set of venue conditions and a set of game conditions to determine whether a set of threshold values corresponding to a set of qualifiers are satisfied. In certain embodiments, a qualifier includes a description of a game condition. For example, the controller 314 may analyze a noise level (e.g., in decibels) and a time remaining or time elapsed in a game to determine an excitement level within the venue. If the noise level is above a first threshold amount (e.g., 70 decibels, 80 decibels, and so on) and the time remaining in the game is above a second threshold amount (e.g., five minutes, ten minutes, thirty minutes), then the excitement level within the venue may satisfy a qualifier for a high excitement level. With the preceding in mind, FIG. 4 illustrates a block diagram for a rule detector component 402 of a virtual skycam system (e.g., 300), according to embodiments of the present disclosure. The rule detector component 402 receives a set of sensor data 416 from a set of sensors 404. The set of sensor data 416 may include a signal sent by a sensor and associated with information detected by the sensor. In certain embodiments, the set of sensor data 416 may include a set of game status data, such as time remaining in the game, time elapsed in the game, time remaining on a game clock, a current score of the game, down and distance for an American football game, and any other suitable game status data. The set of sensor data may additionally or alternatively include a set of venue data, such as a noise level in the venue, an amount of movement by an audience in the venue, an amount of audience members, and any other suitable venue data. In some embodiments, the set of sensor data may include a set of player data, such as a set of player locations, a set of teams competing in the game, a current player in possession of a ball, a location of the ball, a speed of a respective player, an acceleration of a respective player, a distance between two players, a difference in speed between two players, a difference in acceleration between two players, and any other suitable player data.

The rule detector component 402 may include a collector component 408, a conditioner component 410, and a set of qualifiers 412. In certain embodiments, the collector component 408 may collect and may organize received sensor data. The collector component 408 may receive the set of sensor data from the set of sensors 404. The collector component 408 may separate the set of sensor data into a set of timed segments. For example, the set of timed segments may be intervals of five seconds, ten seconds, twenty seconds, or more. Additionally or alternatively, the set of sensor data may be separated (e.g., categorized) into a set of game status data, a set of venue data, and a set of player data.

In certain embodiments, the conditioner component 410 may compare the received sensor data to a set of rules in order to generate qualifiers. The conditioner component 410 receives the set of timed segments associated with the set of sensor data and a set of rules 406. A rule 406 may include satisfying one or more conditions by a timed segment in order to generate a qualifier. In certain embodiments, a condition may include a threshold value (e.g., to be satisfied) associated with collected sensor data. For example, as described above, a rule may require satisfying a condition of a threshold noise level of at least seventy decibels (e.g., eighty decibels, one hundred decibels, and so on) and a condition of a time remaining in the game to be at least five minutes (e.g., ten minutes, twenty minutes, thirty minutes, and so on) in order to generate a high excitement level qualifier. In some embodiments, the high excitement level qualifier may also require a condition of a threshold value for a number of audience members in the venue, a condition of a threshold value for an amount of movement of the audience members in the venue, a condition of a threshold value for a score of the game, and any other suitable condition. Additionally or alternatively, the conditioner component 410 may generate motion-level qualifiers, noise-level qualifiers, play qualifiers, and any other suitable qualifiers. The conditioner component 410 may generate a set of qualifiers 412 in a timed sequence, such as in chronological order (e.g., one after another) based on which qualifier of the set of qualifiers 412 satisfied a corresponding rule of the set of rules 406 first. After a threshold time interval (e.g., of at least five seconds, ten seconds, twenty seconds, and so on), the rule detector component 402 may group each qualifier in the set of qualifiers 412 together to generate an input heap 414. The input heap 414 may include each qualifier of the set of qualifiers 412 satisfied within the threshold time interval. In certain embodiments, the input heap 414 may include a tree-based data structure. The input heap 414 may be a skew heap implemented as a binary tree. In some embodiments, a root node located at a top of the tree-based data structure may correspond to a first chronological qualifier.

Figure 5:
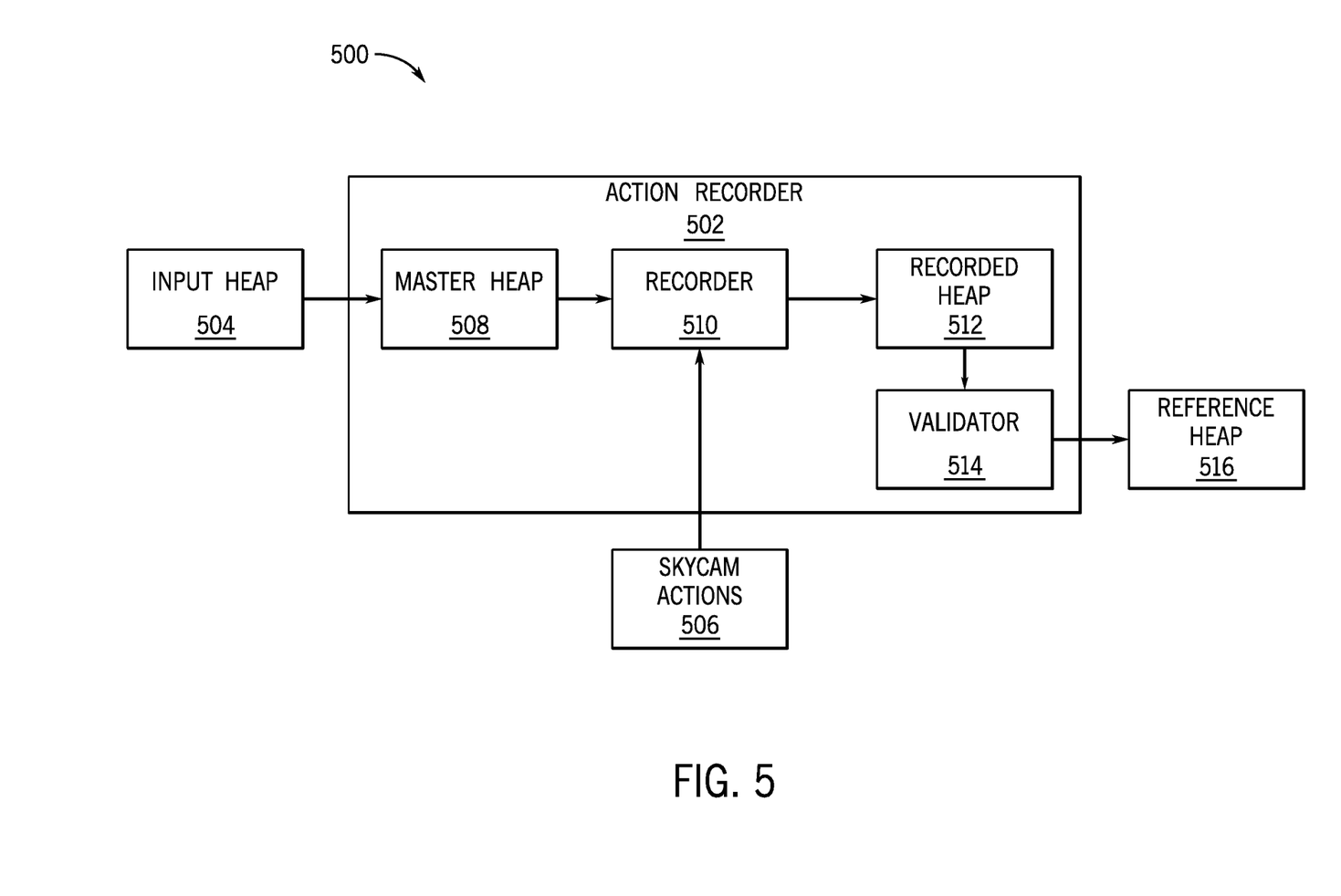
FIG. 5 is a block diagram of an action recorder component of the virtual skycam system of FIG. 3, in accordance with an embodiment of the present disclosure.

Next, the controller 314 may track and record a set of qualifiers associated with a set of skycam actions performed by skycam operator(s) and occurring within a same time frame as the set of qualifiers. With the preceding in mind, FIG. 5 illustrates a block diagram of an action recorder component 502 for a virtual skycam system (e.g., 300), according to embodiments of the present disclosure. The action recorder component 502 receives an input heap 504, such as from the rule detector component 402 of FIG. 4. The action recorder component 502 may include a master heap 508 having a set of qualifiers for a second time interval greater than a time interval for the input heap 504, such as one minute, two minutes, five minutes, or greater. In certain embodiments, the master heap 508 may include any number of qualifiers generated from rule detector component 402. After a time interval for the input heap 504 elapses, the action recorder component 502 may update the master heap 508 to remove the oldest input heap from the master heap 508. For example, the master heap 508 may include a set of twenty input heaps, each input heap corresponding to a ten second interval of satisfied qualifiers. After a further ten seconds elapses, if there is a new input heap 504 to enter into the master heap 508, the action-recorder component 502 may replace the oldest input heap in the master heap 508 with the new input heap 504.

The recorder component 510 may detect a set of skycam actions 506 performed by operators of a skycam. For example, the set of skycam actions 506 may include a set of camera actions and a set of movement actions. In response to detecting the set of skycam actions 506, the recorder component 510 may capture and record a state of the master heap 508 as a recorded heap 512. In certain embodiments, the recorded heap 512 may include a set of qualifiers satisfied within the second time interval from when the set of skycam actions 506 were detected by the recorder component 510. For example, the recorder component 510 may detect that the skycam pans over the audience in a venue for a certain time period. The recorder component 510 may record the set of qualifiers in the master heap 508 corresponding to the certain time period.

The validator component 514 may receive the recorded heap 512 and compare the recorded heap 512 against a previous reference heap to generate a new reference heap 516. In some embodiments, the previous reference heap may be associated with a set of reference qualifiers and a set of reference skycam actions. The set of reference qualifiers may include any number of qualifiers and each reference qualifier may be indicate of any number of conditions satisfied The validator component 514 may include a set of previous reference heaps previously recorded and validated. In some embodiments, the set of previous reference heaps may be manually validated by associating a set of reference qualifiers with a set of reference skycam actions. In some embodiments, the validator component 514 may compare the recorded heap 512 against at least one of the set of previous reference heaps in order to determine an amount of similarity between the recorded heap 512 and the reference heap. For example, the validator component 514 may determine a similarity difference measurement for the recorded heap 512 based on a comparison to at least one of the set of previous reference heaps. In certain embodiments, the validator component 514 may determine a Levenshtein similarity difference by measuring a number of steps required to alter the recorded heap 512 to match the previous reference heap. For example, each step may include inserting a qualifier into the recorded heap 512, removing a qualifier from the recorded heap 512, or replacing a qualifier in the recorded heap 512. In some embodiments, the type of step may be weighted and affect how similar the recorded heap 512 is to the previous reference heap. For example, a weight on a replacement step may be greater than a weight on an insertion step and/or a weight on a removal step in order to accommodate for the recorded heap 512 having a different number of qualifiers from a number of the qualifiers of the previous reference heap.

The action recorder component 502 may generate a new reference heap 516 based on the similarity difference measurement at the validator component 514. In certain embodiments, the action recorder component 502 may generate the new reference heap 516 if the new reference heap 516 has a similarity difference measurement less than a similarity difference measurement for at least one previous reference heap of the set of previous reference heaps (e.g., the new reference heap 516 is more similar to a previous reference heap than another previous reference heap). As such, the action recorder component 502 may associate the same set of reference skycam actions associated with the previous reference heap with the new reference heap 516. In some embodiments, the action recorder component 502 may replace the previous reference heap with the new reference heap 516 if the new reference heap 516 has a similarity difference measurement less than a similarity difference measurement of the previous reference heap. Alternatively, the validator component 514 may determine the similarity difference measurement is greater than the similarity difference measurements for all of the previous reference heaps. As a result, the validator component 514 may discard the recorded heap 512.

Figure 6:
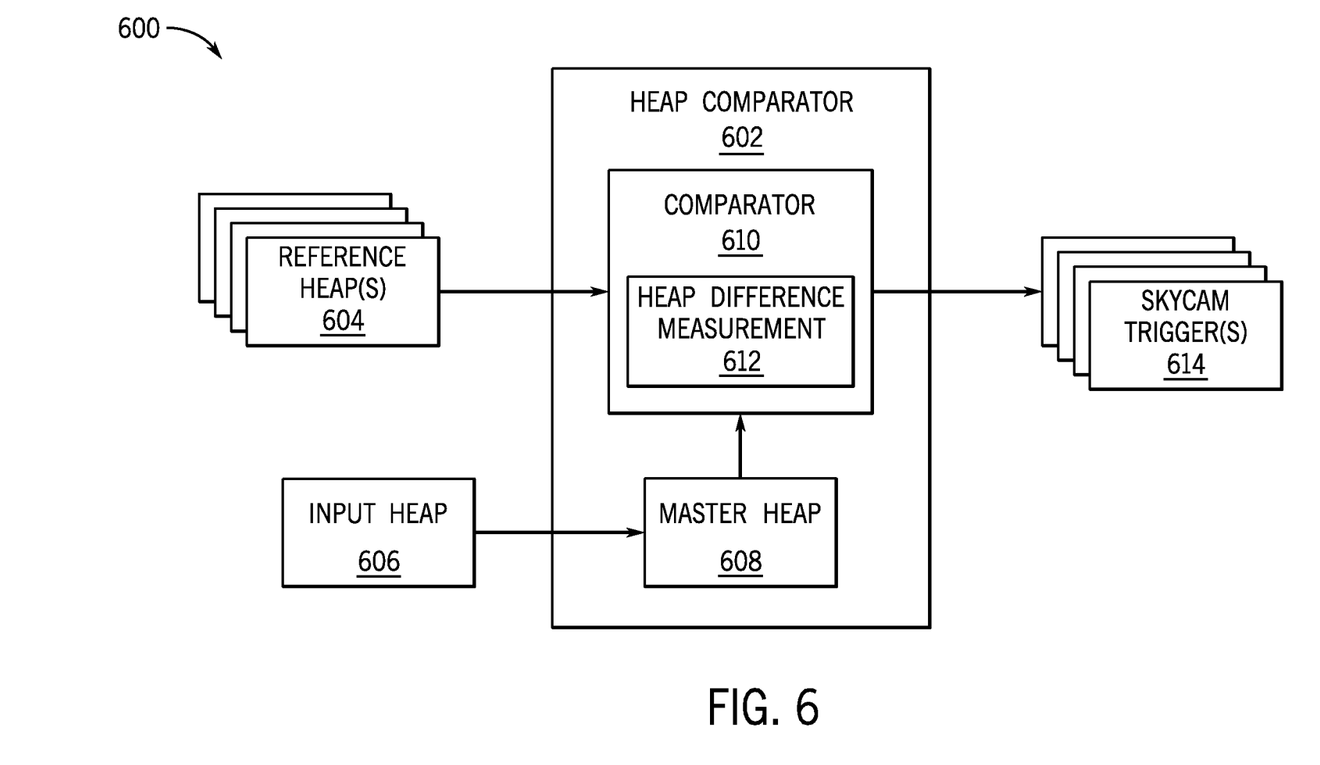
FIG. 6 is a block diagram of a heap comparator component of the virtual skycam system of FIG. 3, in accordance with an embodiment of the present disclosure.

After generating a set of reference heaps associated with a set of reference skycam actions and a corresponding set of qualifiers occurring within a same time frame, the virtual skycam system 300 may receive a new set of qualifiers to be compared with the set of reference heaps. For example, the virtual skycam system 300 may receive a new set of sensor data from a subsequent time period in the game or event and generate the new set of qualifiers with rule detector component 402. In response to determining the new set of qualifiers are within a threshold difference measurement from at least one of the set of reference heaps, the virtual skycam system 300 may generate a set of skycam triggers including the set of reference skycam actions corresponding to the set of reference heaps from the comparison. With the preceding in mind, FIG. 6 illustrates a block diagram for a heap comparator component 602 of a virtual skycam system (e.g., 300), according to embodiments of the present disclosure. The heap comparator component 602 receives a set of reference heaps 604 and an input heap 606. The set of reference heaps 604 may be generated by the action recorder component 502 in FIG. 5 and the input heap may be generated by the rule detector component 402 in FIG. 4. The set of reference heaps 604 may each include a set of qualifiers and a set of skycam actions performed within a same time frame. The input heap 606 may include a set of qualifiers during an ongoing event at a venue.

In some embodiments, the heap comparator component 602 may update a master heap 608 similar to the master heap 508 in FIG. 5. The heap comparator component 602 may include the master heap 608 having a set of qualifiers generated for a second time interval greater than a time interval for which the input heap 606 was generated, such as one minute, two minutes, five minutes, or greater. After a time interval for the input heap 606 elapses, the master heap 608 may be updated to remove the oldest input heap from the master heap 608. For example, the master heap 608 may include a set of twenty input heaps, each input heap corresponding to a ten second interval of satisfied qualifiers. After a further ten seconds elapses, the oldest input heap in the master heap 608 may be replaced by a new input heap 606. In certain embodiments, the master heap 608 may include any number of qualifiers generated from rule detector component 402

The comparator component 610 may generate a heap difference measurement 612 for the master heap 508 based on a similarity difference measurement similar to the similarity difference measurement of the validator component 514 described in FIG. 5. In some embodiments, the comparator component 610 may compare the master heap 608 against at least one of the set of reference heaps 604. For example, the comparator component 610 may determine a similarity difference measurement for the master heap 608 based on a comparison to at least one of the set of reference heaps 604. In certain embodiments, the comparator component 610 may determine a Levenshtein similarity difference by measuring a number of steps required to alter the master heap 608 to match the reference heap. For example, each step may include a type of step such as inserting a qualifier into the master heap 608, removing a qualifier from the master heap 608, or replacing a qualifier in the master heap 608. In some embodiments, the type of steps may be weighted. For example, a weight on a replacement step may be greater than a weight on an insertion step and/or a weight on a removal step in order to accommodate for the master heap 608 having a different number of qualifiers from a number of the qualifiers of the previous reference heap.

In certain embodiments, the comparator component 610 may determine whether the heap difference measurement 612 is within a threshold difference from at least one of the set of reference heaps 604. In some embodiments, the comparator component 610 may generate a set of difference measurements for each difference comparison between the master heap 608 and one of the set of reference heaps 604. In response to the heap difference measurement 612 being within the threshold difference amount, the heap comparator component 602 may generate a skycam trigger 614 based on the corresponding set of reference skycam actions associated with the reference heap. In some embodiments, a set of difference measurements for the master heap 608 may be within a corresponding set of threshold difference amounts for a subset of the set of reference heaps 604. As a result, the comparator component 610 may generate a set of skycam triggers 614 based on the set of difference measurements. The virtual skycam system, such as virtual skycam system 300 in FIG. 3, may generate a sequence of images based on the generated set of skycam triggers 614. For example, the set of skycam triggers may include a sequence of images, such as a first panning shot of the audience, followed by a second overhead shot of the playing field of the venue, and subsequently a wide angle shot of the playing field from one side. The heap comparator component 602 may generate any number of skycam triggers 614 based on the set of difference measurements 612. As such, the heap comparator component 602 may generate a sequence of actions to be performed by a skycam and/or a virtual skycam system based on a set of conditions occurring during a game or event.

Figure 7:
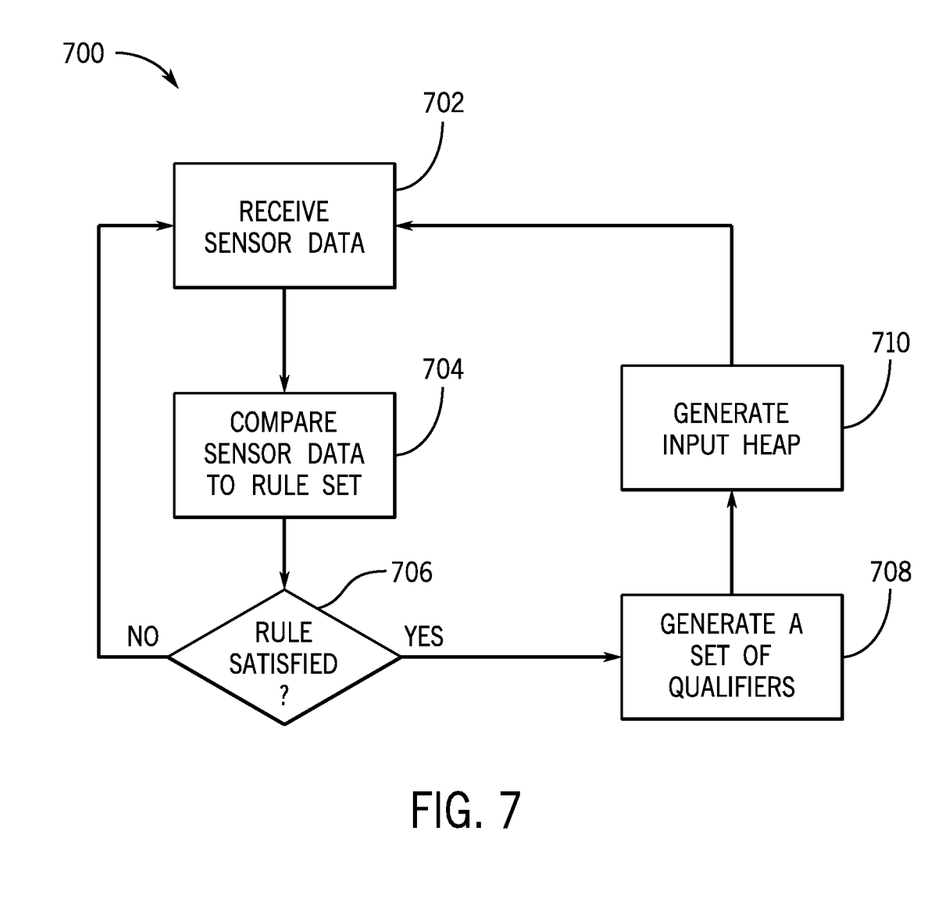
FIG. 7 is a flow diagram of a process for generating an input heap, in accordance with an embodiment of the present disclosure.

With the preceding in mind, FIG. 7 is a flow diagram of a process 700 for generating an input heap, according to embodiments of the present disclosure. While the process 700 is described as being performed by the controller 314, it should be understood that the process 700 may be performed by any suitable device that may control and/or communicate with components of the virtual skycam system 300, such as the controller 314, the processor 312, and/or the rule detector component 402. Furthermore, while the process 700 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium using any suitable processing circuitry, such as the processor 312.

In this process 700, a set of sensor data 310 is generated and transmitted, for example, by the set of sensors 308 of FIG. 3. In some embodiments, the set of sensor data is received at a controller (step 702), such as controller 314 of FIG. 3. The controller 314 may separate the set of sensor data into a set of timed segments. For example, the set of timed segments may be intervals of five seconds, ten seconds, twenty seconds, or more. Additionally or alternatively, the set of sensor data may be separated into a set of game status data, a set of venue data, and a set of player data. Additionally, the controller 314 may receive a set of rules, such as set of rules 406 in FIG. 4, which may include a set of conditions to be satisfied by at least one of the set of timed segments in order to generate a qualifier. For example, as described above, a rule may require a threshold noise level of at least seventy decibels (e.g., eighty decibels, one hundred decibels, and so on) and a time remaining in the game to be at least five minutes (e.g., ten minutes, twenty minutes, thirty minutes, and so on) in order to generate a high excitement level qualifier. In some embodiments, the high excitement level qualifier may also require a threshold value for a number of audience members in the venue, a threshold value for an amount of movement of the audience members in the venue, a threshold value for a score of the game, and any other suitable sensor data.

The controller 314 may compare the set of sensor data to the set of rules (step 704), for example, by the conditioner component 410 of FIG. 4, as described herein. In response to at least one rule of the set of rules being satisfied (step 706), the controller 314 may generate a set of qualifiers (step 708), such as the set of qualifiers 412 in FIG. 4, in a timed sequence, such as in chronological order based on which qualifier of the set of qualifiers satisfied a corresponding rule of the set of rules first. If no rules are satisfied (NO path of step 706), the process 700 may return to step 702 where the controller 314 may receive a new set of sensor data.

The controller 314 may generate an input heap based on the set of qualifiers (step 710). After a threshold time interval of at least five seconds (e.g., ten seconds, twenty seconds, and so on), the controller 314 may group each qualifier in the set of qualifiers together to generate an input heap. The input heap may include each qualifier of the set of qualifiers satisfied within the threshold time interval.

Figure 8:
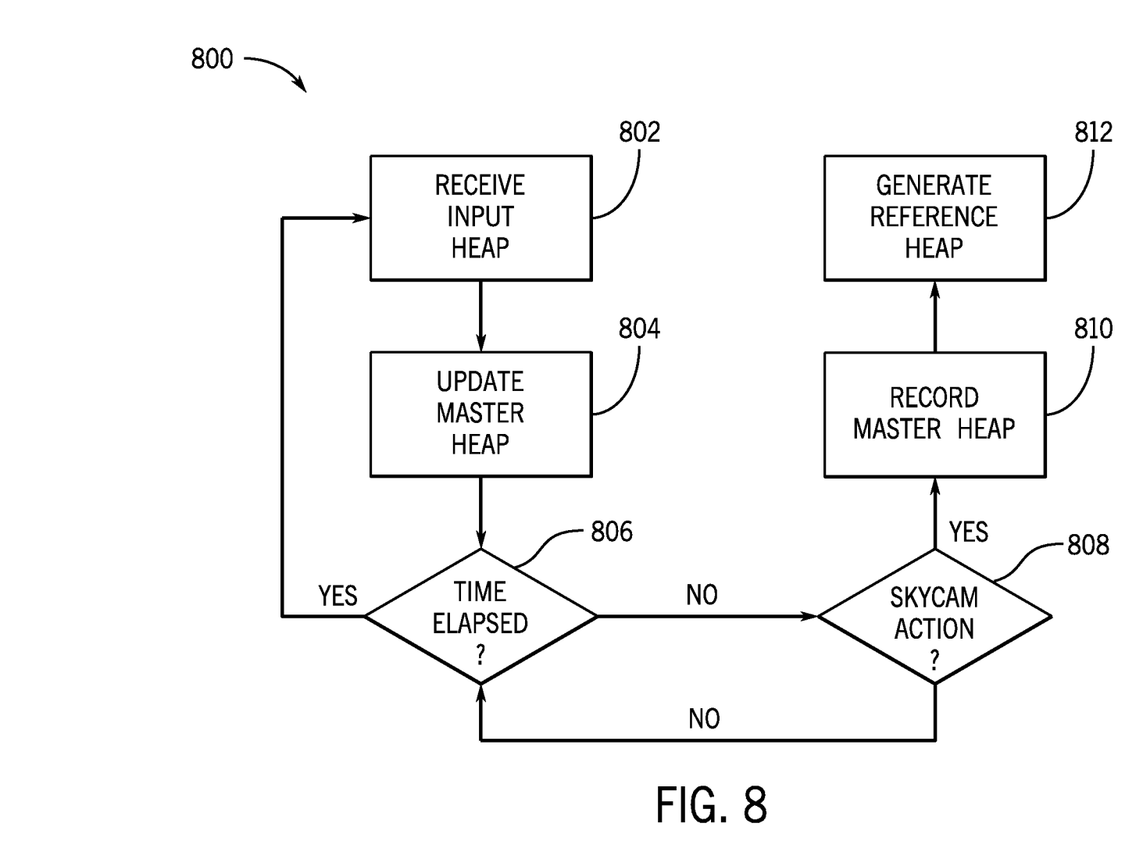
FIG. 8 is a flow diagram of a process for generating a reference heap, in accordance with an embodiment of the present disclosure.

With the preceding in mind, FIG. 8 illustrates a flow diagram for a process 800 for generating a reference heap, according to embodiments of the present disclosure. While the process 800 is described as being performed by the controller 314, it should be understood that the process 800 may be performed by any suitable device that may control and/or communicate with components of the virtual skycam system 300. Furthermore, while the process 800 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium using any suitable processing circuitry, such as the controller 314 the processor 312, and/or the action recorder component 502. Furthermore, while the process 800 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium using any suitable processing circuitry, such as the processor 312.

In this process 800, the controller 314 receives an input heap (step 802), such as an input heap generated by the process 700 of FIG. 7. The controller 314 may update a master heap (step 804) that may include a set of qualifiers for a second time interval greater than a time interval for the input heap, such as one minute, two minutes, five minutes, or greater. After a time interval for the input heap elapses (YES path of step 806), the process 800 may return to step 802 where the controller 314 receives a new input heap and the controller 314 updates the master heap to remove the oldest input heap from the master heap. For example, the master heap may include a set of twenty input heaps, each input heap corresponding to a ten second interval of satisfied qualifiers. After a further ten seconds elapses, the oldest input heap in the master heap may be replaced by a new input heap.

The controller 314 may detect a set of skycam actions performed by operators of a skycam (step 808). For example, the set of skycam actions may include a set of camera actions and a set of movement actions. If no skycam actions are detected by the controller 314, the process 800 may return to step 806 and the controller 314 may determine whether the time interval for the input heap has elapsed.

In response to detecting the set of skycam actions (YES path of step 808), the controller 314 may capture and record a state of the master heap (step 810) as a recorded heap. In certain embodiments, the recorded heap may include a set of qualifiers satisfied within the second time interval from when the set of skycam actions were detected by the controller 314 in step 808. For example, the controller 314 may detect the skycam pans over the audience in a venue. The controller 314 may record the set of qualifiers in the master heap.

In certain embodiments, the controller 314 may receive the recorded heap and compare the recorded heap against a previous reference heap to generate a new reference heap. The controller 314 may include a set of previous reference heaps previously recorded and validated. In some embodiments, the set of previous reference heaps may be manually generated by associating a set of qualifiers with a set of skycam actions. In some embodiments, the controller 314 may compare the recorded heap against at least one of the set of previous reference heaps. For example, the controller 314 may determine a similarity difference measurement for the recorded heap based on a comparison to at least one of the set of previous reference heaps. In certain embodiments, the controller 314 may determine a Levenshtein similarity difference by measuring a number of steps required to alter the recorded heap to match the previous reference heap. For example, each step may include a type of step such as inserting a qualifier into the recorded heap, removing a qualifier from the recorded heap, or replacing a qualifier in the recorded heap. In some embodiments, the type of steps may be weighted. For example, a weight on a replacement step may be greater than a weight on an insertion step and/or a weight on a removal step in order to accommodate for the recorded heap having a different number of qualifiers from a number of qualifiers of the previous reference heap.

The controller 314 may generate the new reference heap (step 812) based on the similarity difference measurement. As such, the controller 314 may associate the set of reference skycam actions associated with the previous reference heap with the new reference heap. In certain embodiments, the new reference heap may have a similarity difference measurement less than a similarity difference measurement for at least one previous reference heap of the set of previous reference heaps. In some embodiments, the controller 314 may replace the previous reference heap with the new reference heap. Alternatively, the controller 314 may determine the similarity difference measurement is greater than the similarity difference measurements for all previous reference heaps. As a result, the controller 314 may discard the recorded heap.

Figure 9:
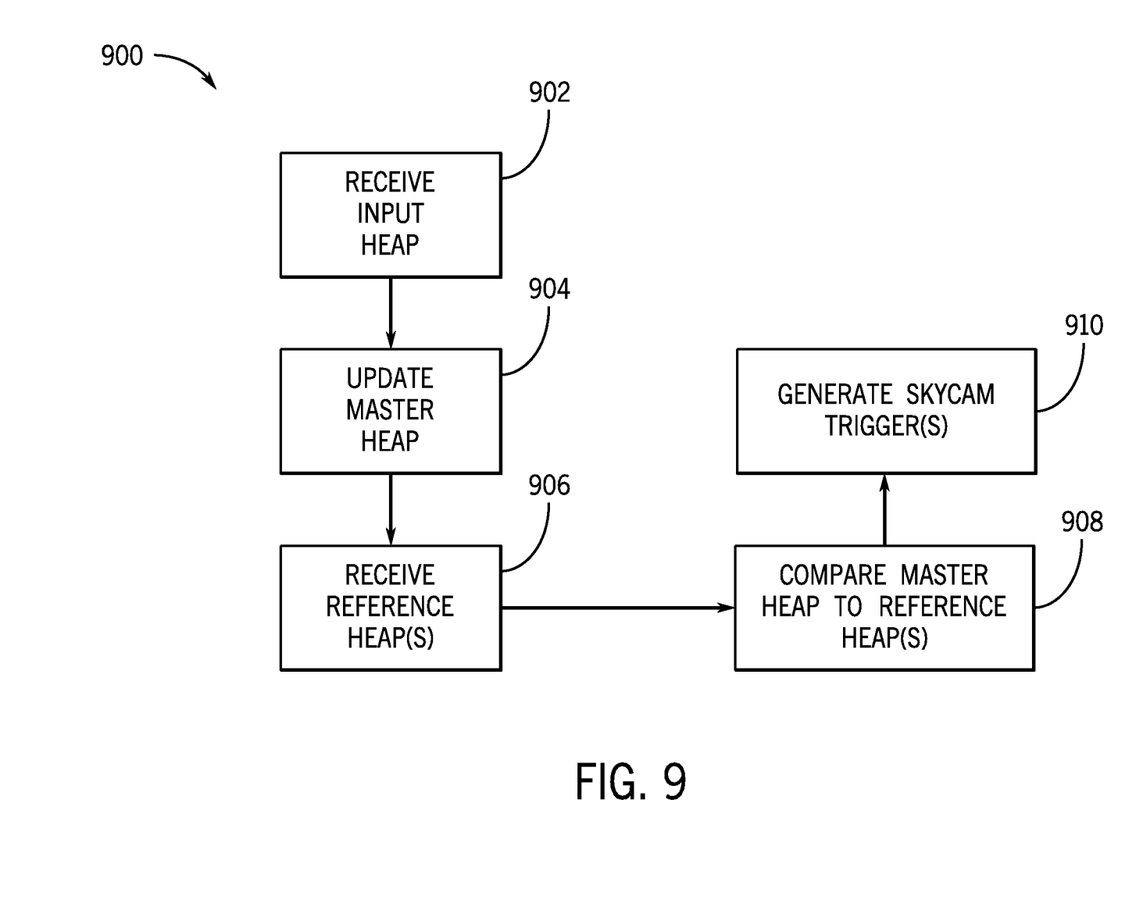
FIG. 9 is a flow diagram of a process for generating a set of skycam triggers, in accordance with an embodiment of the present disclosure.

With the preceding in mind, FIG. 9 illustrates a flow diagram for a process 900 for generating a set of skycam triggers, according to embodiments of the present disclosure. While the process 900 is described as being performed by the controller 314, it should be understood that the process 900 may be performed by any suitable device that may control and/or communicate with components of the virtual skycam system 300. Furthermore, while the process 900 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium using any suitable processing circuitry, such as the controller 314, the processor 312, and/or the heap comparator component 602. Furthermore, while the process 900 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium using any suitable processing circuitry, such as the processor 312.

In this process 900, the controller 314 receives an input heap (step 902), such as an input heap generated by the process 700 of FIG. 7. The input heap may include a set of qualifiers during an ongoing event at a venue. The controller 314 may update a master heap (step 904) that may include a set of qualifiers for a second time interval greater than a time interval for the input heap, such as one minute, two minutes, five minutes, or greater. After a time interval for the input heap, the controller 314 may receive a new input heap and the controller 314 may update the master heap to remove the oldest input heap from the master heap. For example, the master heap may include a set of twenty input heaps, each input heap corresponding to a ten-second interval of satisfied qualifiers. After a further ten seconds elapses, the oldest input heap in the master heap may be replaced by a new input heap.

In certain embodiments, the controller 314 receives a set of reference heaps (step 906). The set of reference heaps may be generated by the process 800 in FIG. 8. The set of reference heaps may each include a set of qualifiers and a set of skycam actions performed within a same time frame.

In some embodiments, the controller 314 may compare the master heap to at least one of the set of reference heaps (step 908) and generate a difference measurement for the master heap based on a similarity difference measurement similar to the similarity difference measurement for the process 800 in FIG. 8. In some embodiments, the controller 314 may compare the master heap against at least one of the set of reference heaps. For example, the controller 314 may determine a similarity difference measurement for the master heap based on a comparison to at least one of the set of reference heaps. In certain embodiments, the controller 314 may determine a Levenshtein similarity difference by measuring a number of steps required to alter the master heap to match the reference heap. For example, each step may include a type of step such as inserting a qualifier into the master heap, removing a qualifier from the master heap, or replacing a qualifier in the master heap. In some embodiments, the type of steps may be weighted. For example, a weight on a replacement step may be greater than a weight on an insertion step and/or a weight on a removal step in order to accommodate for the master heap having a different number of qualifiers from a number of the qualifiers of the previous reference heap.

In certain embodiments, the controller 314 may determine whether the difference measurement is within a threshold difference amount from at least one of the set of reference heaps. In some embodiments, the controller 314 may generate a set of difference measurements for each difference comparison between the master heap and one of the set of reference heaps. In response to the difference measurement being within the threshold difference amount, the controller 314 may generate a sky cam trigger (step 910) based on the corresponding set of reference skycam actions associated with the reference heap from the difference measurement. In some embodiments, a set of difference measurements for the master heap may be within a corresponding set of threshold difference amounts for a subset of the set of reference heaps. As a result, the controller 314 may generate a set of skycam triggers (step 910) based on the set of difference measurements. The virtual skycam system, such as virtual skycam system 300 in FIG. 3, may generate a sequence of images based on the generated set of skycam triggers. For example, the set of skycam triggers may include a first panning shot of the audience, followed by a second overhead shot of the playing field of the venue, and subsequently a wide angle shot of the playing field from one side. The controller 314 may generate any number of skycam triggers based on the set of difference measurements. In certain embodiments, the generated set of skycam triggers may be used to operate a skycam.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

EXAMPLE EMBODIMENTS OF THE DISCLOSURE

The following numbered clauses define certain example embodiments of the present disclosure.

Clause 1.

A system, comprising:
at least one processor; and
at least one non-transitory computer-readable media communicatively coupled to the at least one processor, the at least one non-transitory computer-readable media storing instructions which, when executed, cause the processor to perform operations comprising:
    receiving a first set of sensor data within a first time frame, the first set of sensor data associated with a first game status, a first game measurement, or a combination thereof;
    receiving a set of skycam actions comprising one or more movements of a skycam, one or more changes in focal length of the skycam, or both, wherein the set of skycam actions are received within the first time frame;
    generating a set of reference actions corresponding to the first set of sensor data and the set of skycam actions;
    receiving a second set of sensor data associated with a second game status, a second game measurement, or both; and
    based on a comparison between the second set of sensor data and the set of reference actions, generating a sequence of skycam actions.

Clause 2.

The system of clause 1, comprising the skycam, wherein the instructions, when executed, cause the processor to perform the operations, wherein the operations comprise operating the skycam based on the generated sequence of skycam actions.

Clause 3.

The system of clause 1, comprising:
a plurality of cameras disposed about an area;
wherein the instructions, when executed, cause the processor to perform the operations, wherein the operations comprise:
    receiving a sequence of images from the plurality of cameras; and
    generating the sequence of skycam actions based on the sequence of images, wherein each skycam action of the sequence of skycam actions is a virtual skycam action.

Clause 4.

The system of clause 3, wherein the instructions, when executed, cause the processor to perform the operations, wherein the operations comprise operating the plurality of cameras based on the generated sequence of skycam actions.

Clause 5.

The system of clause 1, wherein the instructions, when executed, cause the processor to perform the operations, wherein the operations comprise:
    determining that the first set of sensor data satisfies a set of conditions; and
    generating, based on the first set of sensor data satisfying the set of conditions, at least one qualifier corresponding to the first set of sensor data, wherein the at least one qualifier is associated with a description of a game condition.

Clause 6.

The system of clause 5, wherein the instructions, when executed, cause the processor to perform the operations, wherein the operations comprise forming a sequence of qualifiers, wherein the sequence of qualifiers is arranged chronologically, and wherein each qualifier in the sequence of qualifiers is associated with a respective description of a respective game condition.

Clause 7.

The system of clause 6, wherein the instructions, when executed, cause the processor to perform the operations, wherein the operations comprise:

removing a portion of the sequence of qualifiers, wherein the portion comprises an oldest qualifier in the sequence of qualifiers; and adding a new set of qualifiers to the sequence of qualifiers, the new set of qualifiers corresponding to a third set of sensor data.

Clause 8.

The system of clause 1, wherein the instructions, when executed, cause the processor to perform the operations, wherein the operations comprise:

determining a difference between a first sequence of qualifiers corresponding to the second set of sensor data and a second sequence of qualifiers corresponding to the set of reference actions, each qualifier in the first sequence of qualifiers and the second sequence of qualifiers associated with a description of a game condition; and comparing the difference to a threshold difference.

Clause 9.

The system of clause 1, wherein the first game measurement comprises a noise level, a motion level, or both.

Clause 10.

The system of clause 1, wherein the first game status comprises a game clock, a game score, or both.

Clause 11.

A method, comprising:

receiving a set of skycam actions during a first time frame, the set of skycam actions comprising one or more movements of a skycam, one or more changes in focal length of the skycam, or both;

recording, in response to receiving the set of skycam actions, a first set of sensor data associated with the first time frame;

receiving a second set of sensor data, the second set of sensor data during a second time frame; and based on a comparison between the second set of sensor data and the first set of sensor data, generating a sequence of skycam actions based on the set of skycam actions.

Clause 12.

The clause of claim 11, comprising:

receiving a sequence of images from a plurality of cameras disposed about a venue; and generating the sequence of skycam actions based on the sequence of images, wherein the sequence of skycam actions include at least one skycam action of the set of skycam actions.

Clause 13.

The clause of claim 11, wherein the comparison comprises:

comparing the first set of sensor data to a set of conditions, each condition associated with a respective threshold value;

generating, based on the first set of sensor data satisfying at least one first respective threshold value of a first respective condition of the set of conditions, a first set of qualifiers corresponding to the first set of sensor data;

comparing the second set of sensor data to the set of conditions; and generating, based on the second set of sensor data satisfying at least one respective second threshold value of a second respective condition of the set of conditions, a second set of qualifiers corresponding to the second set of sensor data.

Clause 14.

The clause of claim 13, wherein the comparison comprises:

determining a difference between the first set of qualifiers and the second set of qualifiers; and comparing the difference to a threshold difference.

Clause 15.

The clause of claim 14, wherein the difference comprises a Levenshtein difference measurement.

Clause 16.

The clause of claim 13, comprising determining a difference between the first set of qualifiers and a third set of qualifiers, wherein the third set of qualifiers comprises a reference set of qualifiers.

Clause 17.

The clause of claim 16, comprising receiving a reference heap associated with a third set of sensor data, the reference heap including the reference set of qualifiers.

Clause 18.

The clause of claim 16, comprising discarding the first set of qualifiers in response to determining that the difference exceeds a threshold.

Clause 19.

The clause of claim 16, comprising:

determining a second difference between the first set of qualifiers and a fourth set of qualifiers, wherein the fourth set of qualifiers comprises a second reference set of qualifiers;

determining a third difference between the third set of qualifiers and the fourth set of qualifiers; and discarding the third set of qualifiers in response to determining that the second difference is less than the third difference.

Clause 20.

A non-transitory, computer-readable medium comprising instructions that, when executed, are configured to cause a processor to perform operations comprising:

generating a set of reference actions corresponding to a first set of sensor data and a set of skycam actions, the set of skycam actions comprising one or more movements of a skycam, one or more changes in focal length of the skycam, or both;

receiving a second set of sensor data associated with a game status, a game measurement, or both; and receiving a sequence of images from a plurality of cameras disposed about an area; and generating a sequence of virtual skycam actions based on the sequence of images and a comparison between the second set of sensor data and the set of reference actions.

Clause 21.

The clause of claim 20, wherein the comparison is based on determining a difference measurement between the second set of sensor data and the set of reference actions.

What is claimed is:

1. A system, comprising:
at least one processor; and
at least one non-transitory computer-readable media communicatively coupled to the at least one processor, the at least one non-transitory computer-readable media storing instructions which, when executed, cause the processor to perform operations comprising:

receiving a first set of sensor data within a first time frame, the first set of sensor data associated with a first game status, a first game measurement, or a combination thereof;

receiving a set of skycam actions comprising one or more movements of a skycam, one or more changes in focal length of the skycam, or both, wherein the set of skycam actions are received within the first time frame;

associating the first set of sensor data and the set of skycam actions;

receiving a second set of sensor data within a second time frame, the second set of sensor data associated with a second game status, a second game measurement, or both;

comparing the second set of sensor data to the first set of sensor data; and in response to determining that the second set of sensor data correlates to the first set of sensor data, generating a sequence of skycam actions based on the set of skycam actions associated with the first set of sensor data.

2. The system of claim 1, comprising the skycam, wherein the instructions, when executed, cause the processor to perform the operations, wherein the operations comprise operating the skycam based on the generated sequence of skycam actions.

3. The system of claim 1, comprising:
a plurality of cameras disposed about an area;
wherein the instructions, when executed, cause the processor to perform the operations, wherein the operations comprise:
receiving a sequence of images from the plurality of cameras; and
generating the sequence of skycam actions based on the sequence of images, wherein each skycam action of the sequence of skycam actions is a virtual skycam action.

4. The system of claim 3, wherein the instructions, when executed, cause the processor to perform the operations, wherein the operations comprise operating the plurality of cameras based on the generated sequence of skycam actions.

5. The system of claim 1, wherein the instructions, when executed, cause the processor to perform the operations, wherein the operations comprise:
determining that the first set of sensor data satisfies a set of conditions; and
generating, based on the first set of sensor data satisfying the set of conditions, at least one qualifier corresponding to the first set of sensor data, wherein the at least one qualifier is associated with a description of a game condition.

6. The system of claim 5, wherein the instructions, when executed, cause the processor to perform the operations, wherein the operations comprise forming a sequence of qualifiers, wherein the sequence of qualifiers is arranged chronologically, and wherein each qualifier in the sequence of qualifiers is associated with a respective description of a respective game condition.

7. The system of claim 6, wherein the instructions, when executed, cause the processor to perform the operations, wherein the operations comprise:
removing a portion of the sequence of qualifiers, wherein the portion comprises an oldest qualifier in the sequence of qualifiers; and adding a new set of qualifiers to the sequence of qualifiers, the new set of qualifiers corresponding to a third set of sensor data.

8. The system of claim 1, wherein the instructions, when executed, cause the processor to perform the operations, wherein the operations comprise:
determining a difference between a first sequence of qualifiers corresponding to the second set of sensor data and a second sequence of qualifiers corresponding to the first set of sensor data, each qualifier in the first sequence of qualifiers and the second sequence of qualifiers associated with a description of a game condition; and
comparing the difference to a threshold difference.

9. The system of claim 1, wherein the first game measurement comprises a noise level, a motion level, or both.

10. The system of claim 1, wherein the first game status comprises a game clock, a game score, or both.

11. A method, comprising:
receiving a set of skycam actions during a first time frame, the set of skycam actions comprising one or more movements of a skycam, one or more changes in focal length of the skycam, or both;
recording, in response to receiving the set of skycam actions, a first set of sensor data associated with the first time frame;
associating the first set of sensor data and the set of skycam actions;
receiving a second set of sensor data associated with a second time frame;
comparing the second set of sensor data and the first set of sensor data; and
in response to determining that the second set of sensor data correlates to the first set of sensor data, generating a sequence of skycam actions based on the set of skycam actions associated with the first set of sensor data.

12. The method of claim 11, comprising:
receiving a sequence of images from a plurality of cameras disposed about a venue; and
generating the sequence of skycam actions based on the sequence of images, wherein the sequence of skycam actions include at least one skycam action of the set of skycam actions.

13. The method of claim 11, wherein the comparison comprises:
comparing the first set of sensor data to a set of conditions, each condition associated with a respective threshold value;
generating, based on the first set of sensor data satisfying at least one first respective threshold value of a first respective condition of the set of conditions, a first set of qualifiers corresponding to the first set of sensor data;
comparing the second set of sensor data to the set of conditions; and
generating, based on the second set of sensor data satisfying at least one respective second threshold value of a second respective condition of the set of conditions, a second set of qualifiers corresponding to the second set of sensor data.

14. The method of claim 13, wherein the comparison comprises:
determining a difference between the first set of qualifiers and the second set of qualifiers; and
comparing the difference to a threshold difference.

15. The method of claim 14, wherein the difference comprises a Levenshtein difference measurement.

16. The method of claim 13, comprising determining a difference between the first set of qualifiers and a third set of qualifiers, wherein the third set of qualifiers comprises a reference set of qualifiers.

17. The method of claim 16, comprising receiving a reference heap associated with a third set of sensor data, the reference heap including the reference set of qualifiers.

18. The method of claim 16, comprising discarding the first set of qualifiers in response to determining that the difference exceeds a threshold.

19. The method of claim 16, comprising:
determining a second difference between the first set of qualifiers and a fourth set of qualifiers, wherein the fourth set of qualifiers comprises a second reference set of qualifiers;
determining a third difference between the third set of qualifiers and the fourth set of qualifiers; and
discarding the third set of qualifiers in response to determining that the second difference is less than the third difference.

20. A non-transitory, computer-readable medium comprising instructions that, when executed, are configured to cause at least one processor to perform operations comprising:

receiving, during a first time frame, a first set of sensor data and a set of skycam actions;

associating the first set of sensor data and the set of skycam actions, the set of skycam actions comprising one or more movements of a skycam, one or more changes in focal length of the skycam, or both;

receiving, during a second time frame, a second set of sensor data associated with a game status, a game measurement, or both;

comparing the second set of sensor data and the first set of sensor data;

receiving a sequence of images from a plurality of cameras disposed about an area; and in response to determining that the second set of sensor data correlates to the first set of sensor data, generating a sequence of virtual skycam actions based on the sequence of images and the set of skycam actions associated with the first set of sensor data.

21. The non-transitory, computer-readable medium of claim 20, wherein the comparison is based on determining a difference measurement between the second set of sensor data and the first set of sensor data.

* * * * *